R. BALL.
SPRING AND SHOCK ABSORBER.
APPLICATION FILED JAN. 18, 1917. RENEWED DEC. 15, 1919.
1,336,184.
Patented Apr. 6, 1920.
2 SHEETS—SHEET 1.
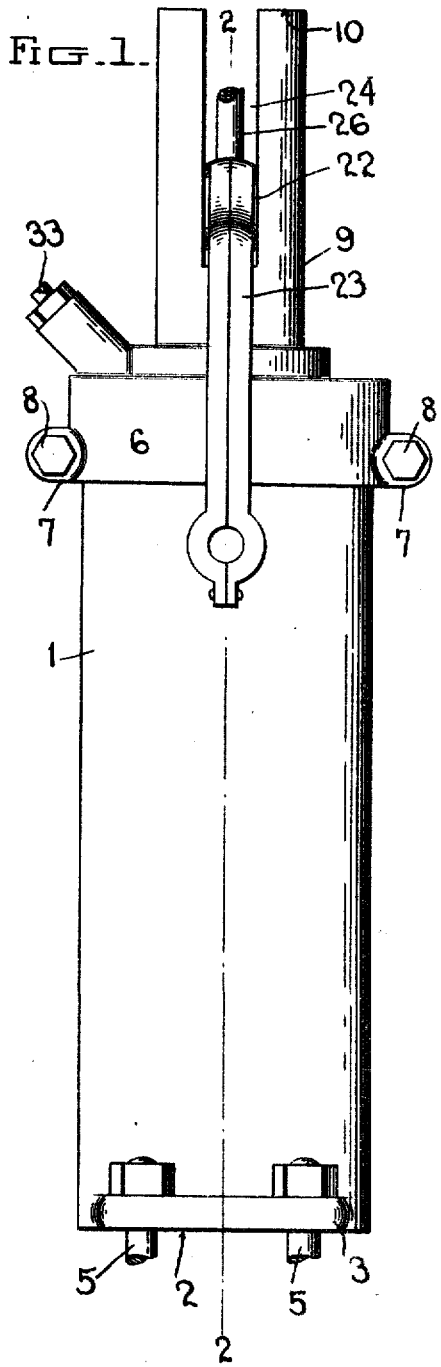
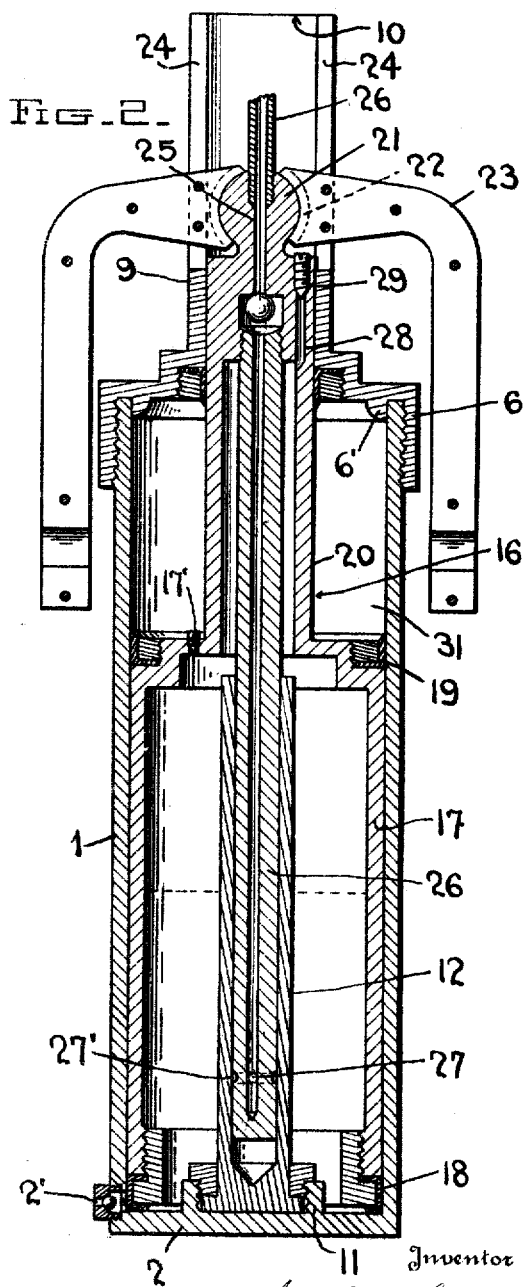
Inventor
Rowland Ball,
By Tilian Johnson
Attorney

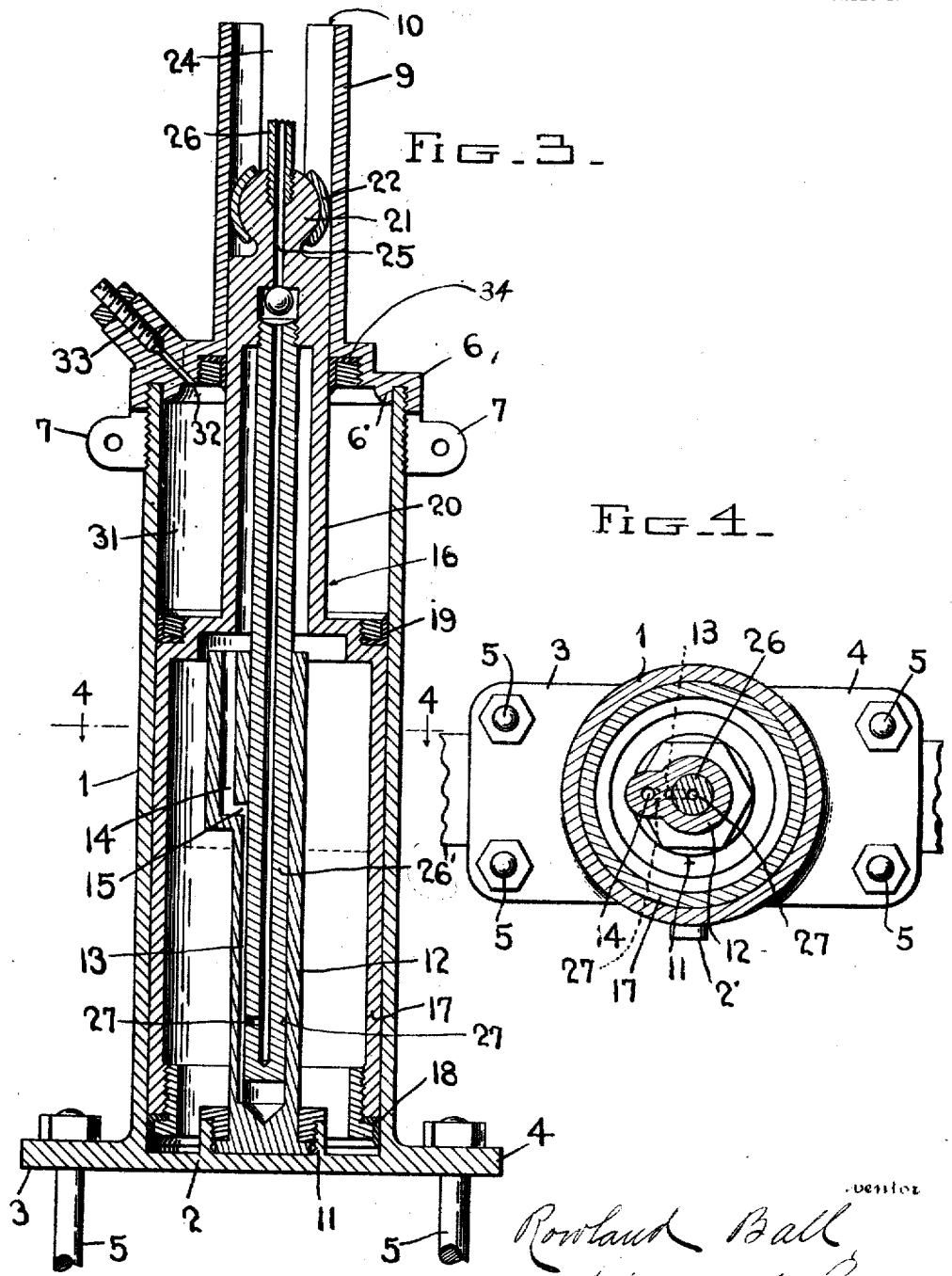

UNITED STATES PATENT OFFICE.

ROWLAND BALL, OF LA GRANGE, ILLINOIS.

SPRING AND SHOCK-ABSORBER.

1,336,184.  Specification of Letters Patent.  Patented Apr. 6, 1920.

Application filed January 18, 1917, Serial No. 143,109. Renewed December 15, 1919. Serial No. 345,126.

*To all whom it may concern:*

Be it known that I, ROWLAND BALL, a subject of the King of Great Britain, residing at La Grange, in the county of Cook and State of Illinois, have invented certain new and useful Improvements in Spring and Shock-Absorbers, of which the following is a specification.

My invention relates to improvements in combined spring and shock absorber.

The object of my invention is to provide a combined spring and shock absorber for vehicles in which the cushioning means is air under pressure and having automatically controlled means for regulating the air pressure for changing the strength of the spring to conform with the load carried by the vehicle and at the same time, maintaining a uniform spring action irrespective of the weight carried.

Another object of my invention is to provide a combined device of this character in which the air used as the spring medium serves as the shock absorbing medium in one direction, and the varying of the spring medium necessarily varies the shock absorbing pressure to correspond with the load and the shock absorbing medium in the other direction is air and has means for varying the air pressure according to the load carried.

A still further object of my invention is to provide a cheap, simple and effective combined spring and shock absorber in which the one feature depends upon the other, and having certain details of structure and combination of parts hereinafter more fully set forth.

In the drawings,

Figure 1 is a side elevation of my improved spring and shock absorber.

Fig. 2 is a vertical longitudinal sectional view, taken on the line 2—2 of Fig. 1.

Fig. 3 is a vertical longitudinal sectional view taken at right angles to Fig. 2.

Fig. 4 is a transverse sectional view taken on the line 4—4 Fig. 3.

Referring to the drawings, the numeral 1 represents a cylinder having a closed lower end 2, provided with lateral flanges 3 and 4 on opposite sides, by means of which it can be attached to the vehicle by means of bolts 5 or in any desired manner. The upper end of the cylinder is externally screw-threaded, upon which is screwed the cap 6 having ears 7 through which the bolts 8 pass, and by means of which the cap is additionally held upon the cylinder. The cap 6 is provided with a central upwardly extending cylinder 9 having an open end 10 as will be later described.

The closed bottom 2 of the cylinder 1 is provided with an upwardly extending annular flange 11 in which is secured the tubular member 12 having an open upper, and closed lower end. One side of the bore of the member 12 has a groove 13 communicating with the passage 14 through the opening 15, and which has its upper end in communication with the interior of the cylinder as shown in Fig. 3.

Within the cylinder 1 is a hollow two step portion 16. The lower enlarged portion 17 closely fits the bore of the cylinder and has a packing 18 at its lower end, forming a tight joint. The upper end of the enlarged portion is provided with a packing 19 which also engages the interior of the cylinder and aids in forming a tight joint. The upper reduced or stepped portion 20 of the hollow piston is also hollow and of an exterior diameter to tightly fit the bore of the cylindrical member 9, and extends some distance therein. The upper end of the piston 20 is closed and has a ball 21 thereon which extends into a socket 22 carried by the yoke 23 which extends outwardly through the slots 24 in the member 9 and to the lower end of which is secured the body of the vehicle.

Extending through the ball 21 is a passage 25 which is in communication with the pipe 26 which leads to a pressure tank which will be later described. Secured in the upper end of the cylinder 20 is a tube 26' which extends downwardly into the member 12 and has a closed lower end. One side of the tube is provided with an opening 27 which communicates with the groove 13, whereby air, under pressure, passes to the piston within the cylinder. Below the passage 25 is a ball valve which is adapted to close the passage and allow the air to pass downwardly, but prevents the air from passing outwardly from within the cylinder. The upper end of the cylinder 20 is provided with a passage 28 communicating with the outside atmosphere, said passage being controlled by a needle-valve 29 to allow a very small discharge of air out of the cylinder, so as to regulate the air pressure therein.

The space 31 above the enlarged portion of the piston and cap 6 is provided with a passage 32 controlled by a needle valve 33 to regulate the shock absorbing effect in the upward direction. The pipe 26 leads to a pressure tank in which air is stored by a pump run by the engine or the exhaust, and which has automatic means for maintaining a predetermined pressure in the tank according to the load to which the spring is being subjected and which pressure is likewise maintained in the cylinder. A packing 34 is carried by the cap 6 to form a tight joint with the stepped portion 20 of the piston.

In operation, the compressor is started, air is forced into the tank until the desired pressure is obtained therein, which is regulated by an automatic governor. The air passes through the pipe 26 and passage 25 by the ball through the tube 26', and is discharged through the opening 27 to the groove 13. The air passes from the groove 13 to the passage 14 and into the piston. This air raises the piston 17 upwardly together with the load until the port 27 has passed the opening 15 and the air is sufficient to maintain the load. The piston is free to move higher if the irregularities of the road require it, but no more air will be admitted to the cylinder. If the piston is forced down by the irregularities of the road then air will be compressed to a higher pressure than that of the tank, as the check valve will close the passage 25 and prevent the air from returning to the tank and will also prevent air from entering the cylinder. Any leakage of the air from the cylinder will cause the piston to gradually descend until the port 27 is in communication with the groove 13, and in such an event, the air in the cylinder is of a pressure slightly less than that in the tank and the air will unseat the ball valve and flow in as before described and raise the piston to its normal position.

The space 31 contains the shock absorbing means and prevents the rapid upward movement of the piston and needle valve 33. The downward movement of the piston is also regulated by the air pressure below, and by the vacuum in this space 31. The movement of the piston in either direction is regulated by the rapidity by which the air is allowed to escape by the valve 33. The needle valve 29 regulates the amount of air allowed to pass out of the cylinder 1 and this permits the regulation of the strength of the springs by simply setting the controlling valve to the desired pressure and the springs will automatically adjust themselves in this pressure.

A needle valve 17' is carried by the piston 17 so that air may pass from the interior of the piston to the space above so that the same can be supplied with air therefrom or from the outside atmosphere, as before stated. In order to prevent the upper end of the cylinder from collapsing when the bolts 8 are tightened, the cap 6 is provided with a downwardly extending annular flange 6' engaging the inner periphery of the cylinder.

The lower end of the cylinder 1 is provided with a nipple 2' having a passage therethrough and provided with a ball valve closed by pressure within the cylinder. This nipple is adapted to be attached to a pump for forcing oil to the cylinder without releasing the air pressure within the cylinder and whereby the cylinder is supplied with oil from time to time.

Having thus described my invention, what I claim is:

1. A combined spring and shock absorber, comprising a cylinder, a piston in the cylinder adapted to support the load, means for maintaining a predetermined fluid pressure in the cylinder below the piston, means carried by the piston for cutting off the fluid pressure supply, and a cushioning means in the space in the cylinder above the piston.

2. A combined spring and shock absorber, comprising a cylinder, a piston in the cylinder adapted to support the load, means for maintaining a predetermined fluid pressure supply in the cylinder below the piston, means carried by the piston for cutting off the fluid pressure supply by the movement of the piston, a cushioning means in the space in the cylinder above the piston, there being a passage connecting said space with the atmosphere, and a valve controlling said passage.

3. A combined spring and shock absorber, comprising a cylinder, a piston therein adapted to support the load, means for maintaining a predetermined fluid pressure supply in the cylinder through the piston, means carried by the piston and operated by the movement thereof for cutting off the fluid supply, said cylinder having a passage communicating with the outside atmosphere, a valve controlling the passage between the cylinder and the outside atmosphere, a cushioning means in the space above the piston, there being a passage connecting said space with the atmosphere, and a valve controlling said passage.

4. A combined spring and shock absorber, comprising a cylinder, an upwardly extending reduced cylindrical member carried by the upper end of the cylinder and in communication therewith, a hollow piston in the cylinder having a reduced upper end fitting in the cylindrical member, means carried by the reduced upper end of the piston for supporting the load, the reduced upper end of the piston being connected to a source of fluid supply, said piston being constructed and arranged to allow the fluid to pass below the same, means carried by the piston for cutting off the fluid supply, when the piston has reached a determined point, a ball valve in the piston to prevent back flow of the fluid through the piston and a cushioning space surrounding the reduced portion of the piston.

5. A combined spring and shock absorber, comprising a cylinder, a hollow piston therein having a reduced upper end extending through the upper end of the cylinder and adapted to support the load, a fluid pressure supply pipe connected with the upper end of the reduced portion of the piston, a ball valve in said piston closed by pressure from within the piston, an upwardly extending cylindrical member carried by the cylinder and extending into the hollow piston, and a tube carried by the reduced portion of the piston and in communication with the fluid supply and entering the cylindrical member, and constructed to cut off the fluid supply after the piston has moved upwardly the determined distance.

6. A combined spring and shock absorber, comprising a cylinder, a hollow piston therein having a reduced upper end extending through the upper end of the cylinder adapted to support the load, a cylindrical member carried by the lower end of the cylinder and extending into the hollow piston having a groove in one side extending a portion of its length and communicating with the reduced upper end of the piston, a fluid supply, a tube carried by the piston communicating with the said fluid supply and having its closed lower end within the cylindrical member, said tube having a lateral passage communicating with the groove so arranged that the fluid pressure passes to the lower end of the cylinder and raises the piston until the lateral passage passes the upper end of the groove, when the fluid pressure is cut off, and a valve in said piston to prevent the fluid passing out of the cylinder when the pressure therein is greater than the pressure in the fluid supply pipe.

7. A combined spring and shock absorber, comprising a cylinder, attaching means carried by the lower end thereof, a cap for closing the upper end of the cylinder and having an upwardly extending cylindrical member in communication with the cylinder and oppositely arranged slots, a hollow piston in the cylinder having a reduced upper end extending into the cylinder, a yoke loosely mounted upon the upper end of the reduced portion of the piston within the cylindrical member and extending out through the slots for supporting the load, means for maintaining a predetermined fluid pressure in the cylinder below the piston to support the load, and a cushioning means in the space above the piston for retarding the upward movement thereof.

In testimony whereof I affix my signature in presence of two witnesses.

ROWLAND BALL.

Witnesses:
HOMER C. COEN,
C. R. MACFARLANE.